United States Patent Office
3,461,104
Patented Aug. 12, 1969

3,461,104
FUEL-RESISTANT POLYURETHANES BASED ON POLYESTERS OF POLYHALOPOLYHYDROMETHANO - NAPHTHALENE CARBOXYLIC ANHYDRIDE
Floyd D. Stewart, Akron, Ohio, assignor to The B. F. Goodrich Company, New York, N.Y., a corporation of New York
No Drawing. Filed June 23, 1967, Ser. No. 648,219
Int. Cl. C08g 22/10
U.S. Cl. 260—75               9 Claims

ABSTRACT OF THE DISCLOSURE

Polyurethanes, which are relatively impermeable to high aromatic content fuel, are prepared by reacting an organic diisocyanate with hydroxyl-terminated polyester, polyether or polyacetal, a hydroxyl-terminated polyester of a 1,2,3,4,9,9 - hexachloro 4a,5,6,7,8a - octahydro - 1,4-methano-naphthalene-6,7-dicarboxylic acid anhydride and an aliphatic diol.

BACKGROUND OF THE INVENTION

Thermoplastic polyurethanes of the types described in U.S. Patents 2,871,218 and 2,899,411 are essentially linear polyurethanes which have high tensile strengths and an excellent balance of other desirable physical and chemical properties. Such materials are prepared from hydroxyl-terminated polyesters or poly(alkylene oxide)s, aliphatic glycols and organic diisocyanates reacted in molar proportions where the mols of polyether or polyester and aliphatic glycols are substantially equivalent to the mols of organic diisocyanates.

While such polyurethanes have excellent resistance to oil and hydrocarbon fuels, it has been found that certain aromatic fuels migrate through these polyurethanes and make them unsuited for some applications. In such applications as flexible fuel tanks where the described polyurethanes are particularly adaptable, the rate of the diffusion of aromatic fuels, or fuels high in aromatic content, require, in the construction of such containers, fuel barriers. In the construction of fuel tanks from polyurethanes where aromatic containing fuels are involved, a barrier such as nylon film has to be built into the fuel tank. This is costly both in extra handling and fabrication as well as the extra materials required.

This invention now provides an improved thermoplastic polyurethane which is strong enough to allow unsupported fuel tank constructions and which are impermeable enough to contain high aromatic content fuel without the use of a fuel barrier. Specifically, the polyurethanes of this invention meet certain specification requirements for a material of construction which will not permit diffusion of a 40/60% toluene-isooctane fuel in amounts greater than 0.025 fluid ounce per sq. ft. in 24 hours.

SUMMARY OF THE INVENTION

The improved polyurethanes of this invention are prepared by reacting one mol of about 90 to 50% of a hydroxyl-terminated polyester, polyether or polyacetal, and about 10 to 50% of a hydroxyl-terminated polyester of an aliphatic diol and 1,2,3,4,9,9-hexachloro-4a,5,6,7,8,8a-octahydro-1,4-methanonaphthalene-6,7-dicarboxylic anhydride, and at least one mol of an aliphatic diol, with about an equimolar proportion of an organic diisocyanate. These polyurethanes are thermoplastic, have a good balance of physical properties, including a fuel permeability diffusion rate of 40/60% toluene-isooctane fuel of less than 0.05 fluid ounce per sq. ft. for 24 hours, and in the more preferred embodiments, diffusion rates less than 0.025 unit.

DETAILED DESCRIPTION OF THE INVENTION

The hydroxyl polyesters are hydroxyl-terminated polyesters having molecular weights between about 500 and 4000 and an acid number less than 10. The polyesters include lactone polyesters and polyesters prepared by an esterification reaction of an aliphatic dibasic acid or an anhydride thereof with the glycol. Lactone polyesters are readily prepared from epsilon lactones and bifunctional compounds, particularly the glycols and the polyesters listed below.

The basic polyesters utilized include polyesters prepared by the esterification of aliphatic dicarboxylic acids including for example, adipic, succinic, pimelic, suberic, azelaic, sebacic and the like or their anhydrides. Minor proportions of aromatic dicarboxylic acids may be used. Useful acids are those aliphatic dicarboxylic acids of the formula HOOC—R—COOH where R is an alkylene radical containing 2 to 8 carbon atoms. The glycols used in the preparation of the polyesters by reaction with the dicarboxylic acids are aliphatic glycols containing between 2 and 10 carbon atoms such as ethylene glycol, propanediol, butanediol, hexamethylenediol-1,6, octamethylenediol-1,8,2-ethylhexyl glycol-1,6 and the like.

The hydroxyl(polyalkalene oxide)s, or polyethers, preferably are essentially linear hydroxyl-terminated compounds having ether linkages as the major linkage joining carbon atoms. The molecular weights may vary between about 500 and 4000. The hydroxyl (polyalkylene oxide)s found useful include hydroxyl poly(methylene oxide)s as hydroxyl poly(tetramethylene oxide), hydroxyl poly(trimethylene oxide), hydroxyl poly(hexamethylene oxide), hydroxyl poly(1,2-propylene oxide)s, hydroxyl poly(ethylene oxide)s and the like of the formula

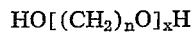

$$HO[(CH_2)_nO]_xH$$

wherein $n$ is a number from 2 to 6 and $x$ is an integer.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and the like reacted with glycols; for example, ethylene glycol, trimethylol propane, hexanediol, diethylene glycol, and the like, which are well known to those skilled in the art. Generally, the polyacetals may be considered to be reaction products of aliphatic aldehyde and glycols. The molecular weights of the polyacetal will be varied from about 500 to about 4000.

The hydroxyl-terminated polyesters of the chlorinated anhydride are normally prepared by reacting an excess of an aliphatic glycol containing 2 to 8 carbon atoms and in which normally the hydroxyl groups are on terminal carbon atoms with the chlorinated anhydride 1,2,3,4,9,9-hexachloro - 4a,5,6,7,8,8a - octahydro - 1,4 - methano-naphthalene-6,7-dicarboxylic acid anhydride. This anhydride is a Diels-Alder reaction product of tetrahydrophthalic anhydride and hexachlorocyclopentadiene, and is referred to herein as the chlorinated anhydride. For the purposes of the preparation of the polyester, ether the anhydride or acid may be used and when the anhydride is referred to in the claims it should be understood that the acid is also included. The polyesters generally are resinous materials. The molecular weight of the polyesters may be varied from about 500 to about 4000. The glycols described in the preparation of the other hydroxyl polyesters described above may be included in preparation of the polyesters of the chlorinated anhydride.

In preparing the polyurethanes, the amount of chlorinated anhydride polyester used is related to and based on the total polyester, and will vary from about 10% to 50% of the chlorinated anhydride polyester and from about 50% to about 90% of the other hydroxyl-terminated polyester or polyether. A more desirable balance of physical properties is obtained when the percentage of polyesters used is from about 15 to about 35% of chlorinated anhydride polyester and about 85 to about 65% of the other hydroxyl-terminated polyester.

A glycol is reacted with the polyesters, and the organic diisocyanate. Such glycols normally are aliphatic glycols containing 2 to 8 carbon atoms and more preferably 3 to 6 carbon atoms. Better results have generally been obtained with glycols which do not contain unsaturation. Typical glycols which have been employed include ethylene glycol, propylene glycol, butanediol-1,4, hexanediol, isooctyl diol, neopentyl glycol and the like.

The amount of glycol reacted with the mixed polyesters and diisocyanate may vary from about one to 12 mols per mol of mixed polyester. Excellent polyurethanes are obtained with a molar ratio of mixed polyester and more than one, as 2 to 5 mols of the golycol. Substituted glycols also may be used.

The organic diisocyanates which are reacted with the polyesters, polyethers or polyacetals and glycols will include, for example, both aliphatic and aromatic diisocyanates although the aromatic diisocyanates generally result in polymers with a more desirable balance of required physical properties. Such diisocyanates include for example, hexamethylene diisocyanate. The aromatic diisocyanates include naphthalene-1,5-diisocyanate, diphenyl methane-4,4'-diisocyanate, m-tolylene diisocyanate, p-phenylene diisocyanate, dichlorodiphenyl methane diisocyanate, dimethyl diphenyl methane diisocyanate, bibenzyl diisocyanate, diphenyl ether diisocyanates, bitolylene diisocyanates and the like. A particularly useful group of diisocyanates are those of the formula

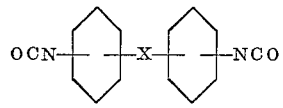

wherein X may be a valence bond, an alkylene radical containing 1 to 5 carbon atoms, NR where R is an alkyl radical, oxygen, sulfur, sulfoxide, sulfone and the like.

The ratio of reactants employed may be varied from about 1.5 to 13 mols of organic diisocyanate per mol of polyesters with 1 to 12 mols of the glycol. The amount of organic diisocyanate used is dependent on the total amount of glycol and polyesters and should be essentially a molar amount equivalent to the total of these latter two reactants so that there are essentially no free unreacted isocyanate groups remaining in the polymer. Excellent results have been obtained when a molar ratio of one mol of polyester, 1.5 to 5 mols of glycol are reacted with 2.5 to 6 mols of the organic diisocyanate. While equimolar ratios are preferred it will be understood that an excess of any reactant, preferably less than 5% of excess organic diisocyanate can be used, although large amounts of diisocyanate may be used.

The reaction employed to prepare the polyurethanes should be conducted under essentially anhydrous conditions with dry reactants. The requirements of this process are met when the reaction mixture is essentially free of water. In all of the examples which follow, a standard reaction procedure was followed. The specified molar ratios of polyesters and glycols were melted in a reactor and stirred at a pressure of 5 to 6 millimeters of mercury at 100 to 110° C. to remove any moisture. To this mixture there is then added the organic diisocyanate and after stirring to obtain complete mixing, the mixture is poured into a silicone coated container which is sealed and heated to 140° C. for about 3 hours. A reaction temperature of between about 100 to 150° C. has been employed, with equivalent longer reaction times at the lower temperatures.

The permeability of the polyurethanes to a 40% toluene-60% isooctane mixture is determined by a static test. A container is filled with standard volume of the test liquid, the opening sealed with a 0.025 inch thick piece of the polyurethane to be tested, weighed, inverted and held at 25° C. for 120 hours. The loss in weight is then determined and permeability calculated as fluid ounces passing through the polyurethane per square foot in 24 hours.

Example I

A polyester of the chlorinated anhydride was prepared by mixing together in a reactor one mol of 1,2,3,4,9,9-hexachloro - 4a,5,6,7,8,8a - octahydro-1,4-methano-naphthalene-6,7-dicarboxylic anhydride, 10 mols of 1,4-butanediol and 0.01 weight percent of stannous chloride and passing carbon dioxide through the mixture while gradually heating the mixture to a temperature of about 220° C., and then reducing the pressure to about 1 mm. Hg until the acid number was below 10. The resulting polyester was washed with water and dried at 120° C. under water aspirator pressure. The polyester had a hydroxyl number of 45.2 and a molecular weight of 1753.

Example II

A polyesterurethane was prepared by melting together 0.075 mol of hydroxyl(polytetramethylene adipate) of a molecular weight of 1030, 0.025 mol of the chlorinated anhydride polyester of Example I, and 0.2 mol of 1,4-butanediol at 100° C. 0.3 mol of diphenyl methane-4,4'-diisocyanate was stirred into the melt for one minute and the mixture then poured into a Teflon coated pan and heated for 3 hours at 140° C. in a forced draft oven. The resulting polymer had a tensile strength of 5400 p.s.i., a 300% modulus of 3600 p.s.i. and an elongation of 450%. The wet tensile strength after 7 days in water was 5000 p.s.i. and the wet tensile strength after 7 days in a mixture of 40% toluene and 60% isooctane was 4000 p.s.i. The fuel permeability was 0.0220 fluid ounce/sq. ft./24 hours of 40% toluene-60% isooctane.

When the above example was repeated with the exception that only 0.01 mol of the anhydride polyester was used with 0.09 mol of the hydroxyl(polyethylene adipate), the fuel permeability value of the polyurethane was 0.0431. When the above example is repeated with the exception that 0.04 mol of the chlorinated anhydride polyester was used with 0.06 mol of the hydroxyl polyethylene adipate the resulting polymer was tough and leathery although having an acceptable fuel permeability value. Also, acceptable polyurethanes are readily prepared when poly(oxyethylene)glycol and poly(oxytetramethylene)glycol of molecular weights 1000–2000 is substituted for the hydroxyl(polyethylene adipate).

Example III

To demonstrate the unexpected improvement in fuel permeability of a polyesterurethane when a hydroxyl polyester is blended with the defined amount of chlorinated anhydride polyester in accordance with this invention, a polyester was prepared to contain the equivalent amount of chlorinated anhydride as that of the 75/25 blend of Example II above, and this polyester then converted into a polyesterurethane.

One mol of the chlorinated anhydride, 3 mols of adipic acid and 12 mols of 1,4-butanediol were reacted together in the presence of 0.01% stannous chloride and heated to form a polyester. The resulting polyester had a hydroxyl number of 37.09, an acid number of less than 10 and a molecular weight of 2384. The polyesterurethane was prepared by melting together the polyester and 1,4-butanediol in a molar ratio of 1 mol of polyester and 2 mols of 1,4-butanediol and thereafter adding diphenyl methane 4,4'-diisocyanate in a ratio of 3 mols and heating to form the polyesterurethane. The resulting polyesterurethane had a tensile strength of 5300 p.s.i., a 300% modulus of 2400 p.s.i. and an elongation of 450%. The fuel permeability value was 0.2217 fluid ounce/sq. ft./24 hours to 40% toluene-60% isooctane. The wet tensile strength of a sample after exposure to a 40% toluene-60% isooctane mixture for 7 days was only 2800 p.s.i.

I claim:

1. Polyurethanes comprising the reaction product of (1) (a) hydroxyl-terminated polyesters, hydroxyl poly-(alkylene oxide)s or polyacetals and (b) a hydroxyl-terminated polyester of 1,2,3,4,9,9-hexachloro-4a,5,6,7,8-8a-octahydro - 14 - methano-naphthalene-6,7-dicarboxylic acid anhydride and aliphatic glycols having molecular weights from about 500 to about 4000, and (2) an aliphatic diol containing 2 to 8 carbon atoms with (3) an organic diisocyanate.

2. The polyurethanes of claim 1 wherein the hydroxyl-terminated polyester is a polyester of an aliphatic dicarboxylic acid or anhydride and aliphatic glycol and the organic diisocyanate is present in about an equimolar amount of the total of (1) and (2), in a molar ratio of one mol of (1) and 1 to 12 mols of (2), and wherein in (1) there is about 10 to about 50 mol percent of (b) and 90 to about 50 mol percent of (a).

3. The polyurethane of claim 2 wherein the polyester is derived from dicarboxylic acids of the formula HOOC—R—COOH where R is an alkylene radical containing 4 to 6 carbon atoms and the aliphatic glycol contains between 2 and 8 carbon atoms, in (1) (b) the aliphatic glycol contains between 2 and 6 carbon atoms, and in (3) the organic diisocyanate is an aromatic diisocyanate 4. The polyurethane of claim 3 wherein the dicarboxylic acid is adipic acid and the aliphatic glycol is butanediol-1,4, the polyester molecular weights are from about 600 to about 2000 and the aromatic diisocyanate has the formula:

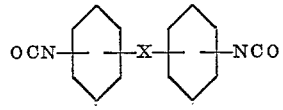

wherein X is a valence bond or an alkylene radical containing 1 to 5 carbon atoms.

5. The polyurethane of claim 4 wherein the molar ratio is one mol of (1) wherein there is about 15 to 35% of (b) and about 85 to about 65% of (a), more than 2 to 5 mols of (2), and there is essentially an equimolar amount of aromatic diisocyanate to (1) and (2).

6. The polyurethane of claim 5 wherein the aromatic diisocyanate is diphenyl methane-4,4'-diisocyanate.

7. The polyurethane of claim 3 wherein (1) (a) is a hydroxyl poly(alkylene oxide) of the formula $$HO[(CH_2)_nO]_xH$$

wherein $n$ is 2 to 4, $x$ is an integer and the molecular weight is from 600 to 2000.

8. The polyurethane of claim 7 wherein the diisocyanate has the formula

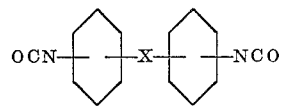

wherein X is a valence bond or an alkylene radical containing 1 to 5 carbon atoms.

9. The polyurethane of claim 8 wherein the diisocyanate is diphenyl methane-4,4'-diisocyanate.

References Cited

UNITED STATES PATENTS

| | | | |
|---|---|---|---|
| 3,058,925 | 10/1962 | Robitschek | 260—2. |
| 3,156,659 | 11/1964 | Robitschek | 260—2. |
| 3,297,796 | 1/1967 | Kujaira et al. | 260—2. |
| 3,297,606 | 1/1967 | Dunkel | 260—2. |

DONALD E. CZAJA, Primary Examiner

H. S. COCKERAM, Assistant Examiner

U.S. Cl. X.R.

137—343, 150; 260—77

PO-1050
(5/69)

UNITED STATES PATENT OFFICE
CERTIFICATE OF CORRECTION

Patent No. 3,461,104                    Dated August 12, 1969

Inventor(s) Floyd D. Stewart

It is certified that error appears in the above-identified patent and that said Letters Patent are hereby corrected as shown below:

Column 2, line 64, "ether" should read ---either---.

Column 3, line 22, after "ratio" insert ---of one mol---; line 23, "golycol" should read ---glycol---; line 60, "large" should read ---larger---.

Column 5, line 12, "14" should read ---1,4---.

Column 6, line 33, under References Cited, "3,297,796" should read ---3,297,596---.

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents